United States Patent [19]

Styner et al.

[11] 3,984,278

[45] Oct. 5, 1976

[54] APPARATUS FOR TENSIONING AND FUSING STRIPS OF THERMOPLASTIC MATERIAL

[75] Inventors: Rudolf Styner, Frauenkappelen; Peter Lehmann, Kirchdorf, both of Switzerland

[73] Assignee: Strapex AG, Wohlen, Switzerland

[22] Filed: June 5, 1975

[21] Appl. No.: 584,046

[30] Foreign Application Priority Data

June 24, 1975 Switzerland.................. 8615/75

[52] U.S. Cl............................. 156/522; 53/198 R; 156/523; 156/580; 228/2
[51] Int. Cl.².................. B32B 31/18; B32B 31/20
[58] Field of Search................ 156/73.6, 580, 522, 156/523; 228/2; 53/198 R

[56] References Cited
UNITED STATES PATENTS

| | | | |
|---|---|---|---|
| 3,554,845 | 1/1971 | Billett et al. | 156/580 |
| 3,554,846 | 1/1971 | Billett et al. | 156/580 |
| 3,669,799 | 6/1972 | Vicins et al. | 156/359 |
| 3,679,519 | 7/1972 | Frey | 156/359 |
| 3,783,079 | 1/1974 | Wehr | 156/580 |
| 3,799,835 | 3/1974 | Gilmore | 156/580 |

*Primary Examiner*—Edward G. Whitby
*Attorney, Agent, or Firm*—Imirie, Smiley & Linn

[57] ABSTRACT

The invention relates to an improved apparatus for tensioning and fusing together strips of plastics material, having a pair of clamping members mounted on a support base and between which members overlapping strip portions are inserted tensioned, and fused together by frictional heat generated upon movement of one clamping member relative to the other; the improvement resides in that the clamping members comprise clamping jaws of which at least one is adapted to be reciprocable at a frequency corresponding to the speed of a drive shaft and that the drive is effected via a gearing which presses said driven reciprocable clamping jaw against the strip abutting it during its movement in the tensioning direction.

18 Claims, 3 Drawing Figures

U.S. Patent  Oct. 5, 1976  3,984,278
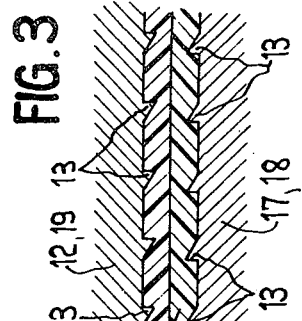
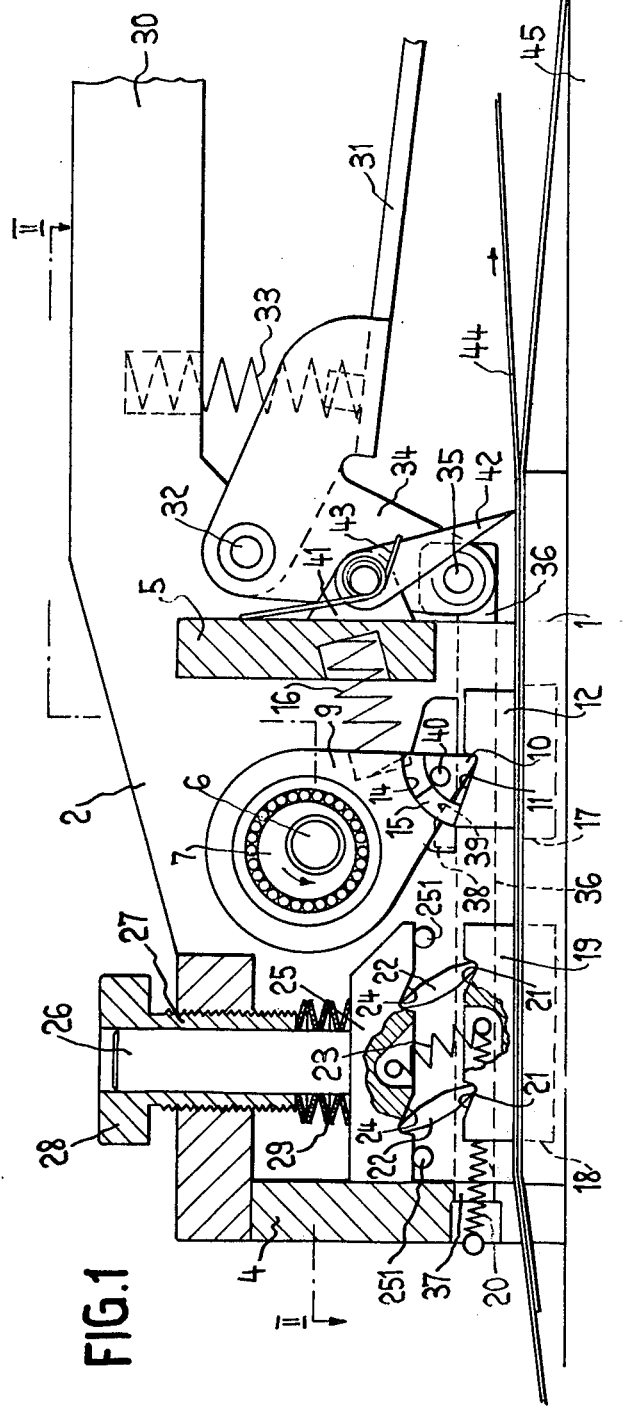
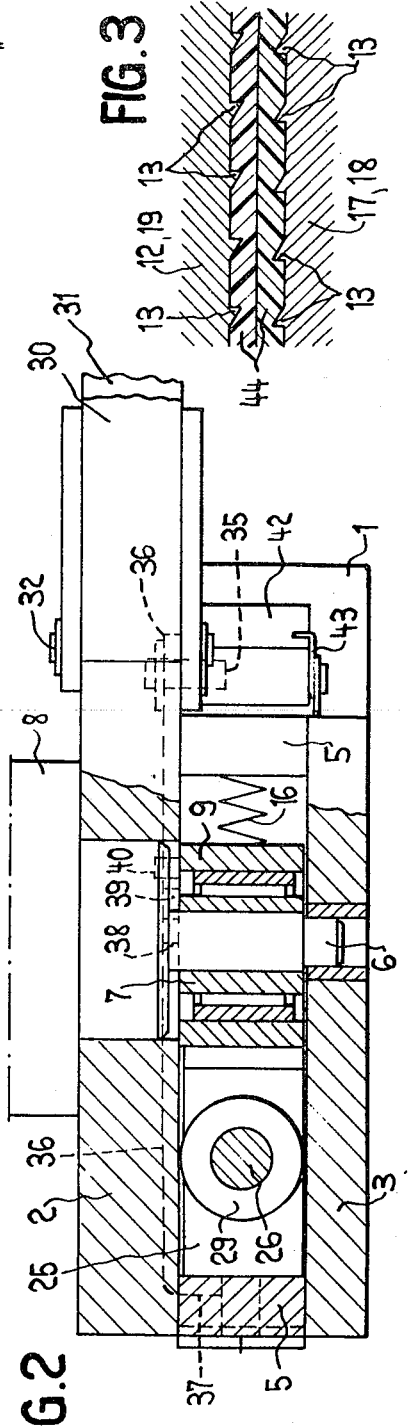

APPARATUS FOR TENSIONING AND FUSING STRIPS OF THERMOPLASTIC MATERIAL

Prior application: Switzerland: No. 8615/74 of June 24, 1974

BACKGROUND OF THE INVENTION

The present invention relates to apparatus for tensioning and fusing plastic material strips, in which overlapping strip sections can be inserted between a pair of clamping members and by movement of one clamping member relative to the other the strip is tightened and subsequently fused by frictional heat. Tightening and fusing apparatuses of this kind are known (for example in U.S. Pat. No. 3,669,799) in which one clamping member is formed as a roller. This roller may be driven gradually in one direction for tightening the strip and, after such tightening, is rotated in an oscillatory reciprocating manner during which the strips are fused or welded together by frictional heat. In this known apparatus the clamping pressure has to be produced between the tensioning roller and a backing jaw by pressing the roller against one of the strips located between it and the backing jaw and this compressive pressure then remains constant. Operation of the apparatus is therefore fairly strenuous. Moreover, a relatively cumbersome gearing is required to convert the initial gradual stepping movement of the roller for tightening the strip to the oscillatory movement of the roller for fusing the strips together.

Tightening and fusing apparatuses are also known in which a tightening roller is continuously driven via a reduction gear for tightening the strip and in which reciprocating movement is produced for fusing the strip by a separate gearing. This tightening and fusing device requires a fairly costly reduction gear and also a separate drive for a reciprocating movement.

SUMMARY OF THE INVENTION

It is an object of the present invention to provide a substantially simplified tensioning and fusing apparatus for plastic material strips.

According to the present invention an apparatus for tensioning and fusing plastic material strips includes a pair of clamping members between which overlapping strip portions are to be inserted, and a clamping member which is movable to tension the strip and fuse the overlapping portions together by frictional heat, wherein the pair of clamping members are formed by clamping jaws of which at least one is adapted to be reciprocable at a frequency corresponding to the speed of a drive shaft and the drive is effected via a gearing which presses the driven reciprocable clamping jaw against the strip abutting it during its movement in the tensioning direction.

Since under these circumstances one clamping jaw is directly reciprocated both for tightening or tensioning the strip and for welding the strips together at a frequency corresponding to the speed of a driving shaft, an extremely simple gearing is provided without or with only a slight reduction. During the tensioning of the strip, the driven clamping jaw during its movement in the direction of tensioning is automatically pressed against the strip abutting it. The clamping pressure need not be applied by a manually actuated tensioning device since the clamping pressure is produced both during the tightening of the strip and during fusing of the strips by the mechanism itself.

The invention will be described further, by way of example with reference to a preferred embodiment shown in the accompanying drawing.

BRIEF DESCRIPTION OF THE DRAWING

FIG. 1 is a longitudinal sectional view through a tensioning and welding apparatus according to the present invention;

FIG. 2 is a longitudinal horizontal sectional view taken along line II—II of FIG. 1; and FIG. 3 is an enlarged fragmentary view of a pair of clamping jaws of the apparatus of FIG. 1 having two strips clamped therebetween.

DESCRIPTION OF THE PREFERRED EMBODIMENT

The apparatus shown in the drawings has a frame with a foot 1 and two side portions 2 and 3 interconnected by end portions 4 and 5. A driving shaft 6 with an eccentric 7 is mounted in the side portions 2 and 3 and, via a needle bearing, permits a lever 9 to be driven. The driving shaft 6 is driven with relatively slight reduction by a drive motor 8 (partly shown in FIG. 2) either directly or via a gearing. The speed of the driving shaft 6 should not exceed about 8,000 revolutions per minute. The cutting edge-like end 10 of the lever 9 engages in a notch 11 of a displaceable clamping jaw 12. This clamping jaw, as shown in FIG. 3, is provided with relatively fine teeth 13 which are slightly inclined to the right. The lever 9 is provided laterally with circular grooves 14 and in each of these grooves there engages a corresponding circularly bent segment 15 of the clamping jaw 12; the clamping jaw 12 being captively connected to the lever 9. A compression spring 16 is supported on the end portion 5 and acts on the lever 9. The clamping jaw 12 is displaceable, drivable and co-operates with an opposing clamping jaw 17 which is secured to the foot 1, (FIG. 3).

A further securely attached opposing clamping jaw 18 is mounted on the foot 1 and co-operates with a detent clamping jaw 19. The teeth of the clamping jaws 18 and 19 correspond to the teeth of the clamping jaws 12 and 17, i.e. all these clamping jaws have teeth 13 which are inclined slightly in the direction of the force to be transmitted to the abutting strip. A tension spring 20 which tends to constantly urge this clamping jaw to the left in FIG. 1 acts on the clamping jaw 19. Inclined levers 22 are provided and engage at the top in corresponding notches 24 of a plate 25 and engage beneath in two notches 21 of the clamping jaw 19. Between the clamping jaw 19 and the plates 25, a tension spring 23 acts to constantly pull these parts together and retains the levers 22 under pressure such that they are unable to drop out of the notches 21 or 24. The plate 25 is provided with a guide bolt 26 which is located to be slidable vertically in a threaded sleeve 27. The threaded sleeve 27 may be adjusted vertically by turning a handwheel 28 to adjust the tension of a plate spring assembly 29 located between sleeve 27 and the plate 25. The lower end position of the plate 25 is determined by pins 251.

The side portion 2 has an extension 30 acting as a grip. A hand lever 31 is mounted on the extension pivotal about the axis 32 and is normally retained in the lower end position, as shown, by a compression spring 33. An extension 34 of this lever 31 is pivotally connected with a control slider 36 by means of a pivotal axle 35 and said slider is guided between the side portions 2 and 3 so as to be longitudinally displaceable. The free end of the slider 36, located on the left-hand side in FIGS. 1 and 2, has an inwardly bent projection 37 the purpose of which is to act on the adjacent end of the pawl clamping jaw 19. The control slider 36, moreover, has an upwardly projecting lug 38 provided with an inclined flank 39 which co-operates with a pin 40 on the lever 9.

A separating blade 42 is pivotally mounted between two eyes 41 of the end portion 5. A spring 43 acts in a clockwise direction on the blade 42 and keeps it in contact with the upper end 44 of the strip which leads to the storage roll of the strip (not shown). The strip extends from the end 44, below the two clamping jaws 12 and 19, is then looped around a package 45 indicated in FIG. 1 and then passed below the end 44 of the strip over the fixed clamping jaws 17 and 18. One end of the pivotal axle 35 engages beneath the blade 42 and lifts it up when the slider 36 is displaced to the right.

The apparatus is used to displace the end 44 of the strip in FIG. 1 to the right and thus tension the loop of strip around the package, and then to fuse or weld together the strip portions located one above the other between the clamping jaws 12 and 17 and possibly simultaneously also fuse together the strip portions between the clamping jaws 19 and 18. The apparatus is hence used for tightly encircling packages with plastic material strips.

FIG. 1 shows the device in the position of readiness, i.e. wherein the overlapping ends of the strip have been inserted between the pairs of clamping jaws, the blade 42 is supported on the end 44 of the strip and the hand lever 31 assumes its lower end position, i.e. the control slider 36 has been pushed completely to the left, so that neither its end 37 nor its lug 38 is able to obstruct the movement of the clamping jaw 19. The drive motor is now switched on at a suitable speed, for example, of 8,000 revolutions per minute, and drives the shaft 6. The eccentric 7 hence actuates the lever 9 at a frequency corresponding to the speed of the shaft so that the driven clamping jaw 12 is reciprocated with corresponding frequency. Thus the lever 9, with the sense of direction of the driving shaft 6 indicated in FIG. 1 such that the underside of this shaft moves in the direction of the working stroke of the driven clamping plate 12, begins to move from the fairly steep position shown, downwardly and with its sharp edge 10 to the right. The lever 9 hence initially acts fairly steeply on the driven clamping jaw 12 and presses it with relatively high pressure against the upper strip, so that the teeth of the clamping jaw 12 penetrate this strip. Subsequently the lever 9 pushes the clamping jaw 12 to the right in FIG. 1, whereby the position of the lever is somewhat more shallow and therefore the compressive pressure of the clamping jaw 12 is somewhat less. The upper end 44 of the strip is therefore now carried along to the right. The end of the strip thus slides beneath the pawl clamping jaw 19 which hence against the pull of the spring 20 is carried along therewith somewhat to the right and is hence relieved consequent to a certain additional inclined position of the lever 22. When the lever 9 has reached its lower dead center position, then its cutting edge 10 moves to the left, so that the driven clamping jaw 12 coupled to the lever 9 by the grooves 14 and the segments 15 is returned to the left while being biased against the upper strip by spring 16. The upper strip 44 herewith initially remains practically stationary because it has not been tensioned flush around the package. The operation just described is now repeated in rapid succession so that the strip is quickly tensioned and laid flush around the package 45. As soon as a certain strip tension occurs, the strip tends during the return of the driven clamping jaw 12 to move to the left therewith. This return movement, however, is substantially prevented by the pawl clamping jaw 19 in that, when attaining a certain initial tension in the upper strip the pawl clamping jaw 19 is unable to raise the plate 25. If a considerable tension is then attained such that the plate is raised via the inclined levers 22 against the action of the plate springs 29, a toggle action occurs quickly whereby, for raising the plate 25, only a very low tension in the strip is still required. Hence no strip conveyance occurs at all in that the strip returns to exactly the same extent as it has been advanced after the working stroke of the driven clamping jaw 12. Before this stage has been reached the strip return movement is in an amount of, for example, about 2 mm which suffices to permit the blade 42 to enter the strip to such an extent that the end 44 of the strip located on the right is severed. When the above stage has been attained, where the upper strip is only being reciprocated and slides along the lower end of the strip, fusing of both ends of the strips occurs below the clamping jaw 12 and possibly also below the clamping jaw 19.

When the fusing has ended, the motor is switched off and then after a certain delay, during which the fusing positions can cool off and solidify, the hand lever 31 is raised. This causes the control slider 36 to be displaced to the right. Its inwardly curved end 37 hence engages the pawl clamping jaw 19 and pushes it to the right against the tension of the spring 20 whereby this clamping jaw is relieved and subject to the pull of the spring 23 lifted-off the upper strip. The lug 38 with its inclined flank 39 engages the pin 40 of the lever 9 and, together with the clamping jaw 12 coupled therewith, lifts it off the upper strip, and the pivotal axle 35 raises the blade 42. The apparatus can now be pulled laterally from the loop of the strip and used at another position for tensioning and fusing a loop of the strip. For this purpose, with the hand lever 31 raised, causing clamping jaws 12 and 19, and blade 42 to be raised, the ends of the strip are inserted laterally between the pairs of clamping jaws 12, 17 and 19, 18 and then the hand lever 31 released so that it assumes the rest position shown. The control slider 36 hence also returns into the rest position shown and releases the clamping jaws 12 and 19 so that they abut against the upper strip. By switching on the motor a new tensioning and fusing operation can be initiated.

The strip tension can be preselected simply by adjusting the threaded sleeve 27 or by setting the tension of the plate springs 29. The stronger the springs 29 are tensioned, the more force is required to raise the plate 25 when the pawl clamping plate is displaced to the left by the returning upper strip.

Blade 42 of the kind shown may also be used with advantage in alternative embodiments of strip tensioning and fusing apparatuses, and possibly also in apparatuses which are not used for fusing together the strip ends. It is merely necessary at a suitable moment of the tensioning operation for the upper strip on which the blade is supported to return temporarily through a sufficient distance of at least about 2mm to cause the cutting operation. Tests have shown that the lower strip does not suffer any damage or weakening thereby.

We claim:

1. In an apparatus for tensioning and fusing together overlapping strip portions of a strip of thermoplastic material encircling an object such as a package, said apparatus having a pair of clamping members mounted on a support base and between which clamping members said overlapping strip portions are adapted to be inserted and clamped, and a gearing for imparting a relative movement to said clamping members for first tensioning said strip around said object by advancing one of said strip portions in a tensioning direction relative to the other and for subsequently fusing said strip portions by friction heat as soon as a predetermined tension in the strip is reached, the improvement wherein said clamping members comprise clamping jaws, a first one thereof being driven by said gearing to execute a reciprocating movement relative to a second one of said clamping jaws for tensioning and fusing together the strip portions, said gearing comprising coupling means for engaging said first clamping jaw and pressing the same against the strip portions in a tensioning direction during a working stroke and for partially relieving such pressing during its back stroke, and stop means adapted to engage the overlapping strip portions for preventing return movement of said one strip portion during the back stroke of said first clamping jaw until said predetermined tension in the strip is reached.

2. Apparatus according to claim 1, wherein said gearing further comprises a splined gearing in which an eccentric of a drive shaft acts on the first clamping jaw via a drive lever inclined towards the direction of tensioning.

3. Apparatus according to claim 2, wherein the direction of rotation of said drive shaft is selected to be such that the side of the driving shaft facing the driven clamping jaw moves in the direction of the working stroke of the clamping jaw.

4. Apparatus according to claim 1, wherein said stop means comprises a second pair of clamping jaws.

5. Apparatus according to claim 4, wherein said pair of stop clamping jaws is provided with a displaceable clamping jaw adapted to be splined against an abutment.

6. Apparatus according to claim 5, wherein said displaceable stop clamping jaw is adapted to be retained in a splined position by a spring.

7. Apparatus according to claim 4, wherein both of said pairs of clamping jaws are adapted to be spread open for insertion and removal of said strips.

8. Apparatus according to claim 7, wherein said displaceable clamping jaw of each pair is raisable by a control slide.

9. Apparatus according to claim 8, wherein the control slide is displaceable by means of a hand lever.

10. Apparatus according to claim 2, wherein the drive lever is captively coupled with said clamping jaw driven thereby.

11. Apparatus according to claim 10, wherein circular segments of said clamping jaw engage in lateral, circular grooves of the drive lever.

12. Apparatus according to claim 4, wherein a displaceable stop clamping jaw of the second pair of clamping jaws is supported via inclined levers against a plate loadable with adjustable resilience.

13. Apparatus according to claim 12, wherein said inclined levers are inserted loosely between notches of said displaceable stop clamping jaw and said plate, and wherein a tension spring acts between the stop clamping jaw and the plate.

14. Apparatus according to claim 13, wherein said plate has a guide bolt which is retained so as to be longitudinally displaceable in a threaded sleeve screwed to the frame of the apparatus, whereby a plate spring assembly is located between the threaded sleeve and the plate and retained on the guide bolt.

15. Apparatus according to claim 1, wherein an inclined spring-cutting blade is provided which penetrates the one strip portion and severs it during a certain return movement of the strip portion during the tensioning.

16. A tensioning apparatus for binding strips in which two ends of the strip are inserted between tensioning members for placing the strip in tension and in which the end of the strip can be severed after tensioning, said apparatus comprising means for tensioning the strip by a member reciprocable in the direction of tensioning, a cutting blade having a cutting edge, and means biasing said cutting blade for frictional engagement of said cutting edge with said strip, said cutting blade being pivotally disposed adjacent said reciprocable member in an inclined position with said cutting edge against the strip, the inclination of said cutting blade from its pivotal axis to said cutting edge being in the direction of tensioning movement of the strip whereby return movement of the strip after having been placed in tension causes movement of the cutting blade toward an upright position whereupon the cutting edge of the blade penetrates and severs the strip.

17. Apparatus for tensioning and fusing together overlapping strip portions of a strip of thermoplastic material encircling an object, comprising:
 a pair of clamping jaws movable relative to each other and adapted to receive said overlapping strip portions therebetween;
 drive means coupled to at least one of said clamping jaws for reciprocating said jaws relative to each other and for pressing the jaws against said overlapping strip portions with a predetermined force during the tensioning stroke of each reciprocal cycle and for partially relieving said force during the return stroke of each reciprocal cycle; and
 stop means adapted to engage said overlapping strip portions for preventing slackening thereof during said return stroke, whereby said strip is tensioned and said overlapping portions are frictionally fused by said pair of clamping jaws.

18. Apparatus according to claim 17, further including a cutting blade having a cutting edge, and means biasing said cutting blade for frictional engagement of said cutting edge with said overlapping strip portions, said cutting blade being pivotally disposed adjacent said pair of clamping jaws in an inclined position with said cutting edge against said overlapping strip portions, the inclination of said cutting blade from its pivotal axis to said cutting edge being in the direction of tensioning movement of the uppermost one of said overlapping strip portions whereby return movement of said one strip portion after having been placed in tension causes movement of the cutting blade toward an upright position whereupon the cutting edge of the blade penetrates and severs said one strip portion.

* * * * *

UNITED STATES PATENT OFFICE
CERTIFICATE OF CORRECTION

PATENT NO. : 3,984,278
DATED : October 5, 1976
INVENTOR(S) : RUDOLF STYNER ET AL It is certified that error appears in the above-identified patent and that said Letters Patent are hereby corrected as shown below:

In the Foreign Application Priority Data

"June 24, 1975  Switzerland  8615/75", should be

-- June 24, 1974  Switzerland  8615/74 --

Signed and Sealed this

Twenty-second Day of March 1977

[SEAL]

Attest:

RUTH C. MASON
*Attesting Officer*

C. MARSHALL DANN
*Commissioner of Patents and Trademarks*